United States Patent [19]

Suesada et al.

[11] Patent Number: 5,264,920
[45] Date of Patent: Nov. 23, 1993

[54] WORD RATE CONVERSION PROCESSING DEVICE FOR PROCESSOR CIRCUIT FOR PROCESSING DIGITAL COMPONENT VIDEO SIGNALS SAMPLED BY DIFFERENT SAMPLING FREQUENCIES

[75] Inventors: Kunio Suesada, Ikoma; Katsuhiko Yamamoto, Neyagawa, both of Japan

[73] Assignee: Matsushita Electric Industrial Co. Ltd., Osaka, Japan

[21] Appl. No.: 884,166

[22] Filed: May 18, 1992

[30] Foreign Application Priority Data

May 24, 1991 [JP] Japan ................. 3-119705

[51] Int. Cl.$^5$ .................. H04N 11/06; H04N 9/89
[52] U.S. Cl. ........................ 358/12; 358/320
[58] Field of Search ........... 358/11, 12, 140, 138, 358/15, 16, 142, 141, 320

[56] References Cited

U.S. PATENT DOCUMENTS

| 4,730,223 | 3/1988 | Ikeda et al. .................. 358/335 |
| 5,132,781 | 7/1992 | Shimokoriyama et al. ...... 358/13 |
| 5,159,438 | 10/1992 | Rabii .............................. 358/12 |

FOREIGN PATENT DOCUMENTS 0338781A 10/1989 European Pat. Off. .
0405885A 1/1991 European Pat. Off. .

OTHER PUBLICATIONS

"A Complete Post-Production System for All Video Formats," SMPTE Journal, vol. 100, No. 1, Jan. 1991, pp. 19-22.
J. Heitmann, "Wide Screen Recording," Fernseh Und Kino Technik, vol. 45, No. 10, pp. 524-527.
Heitmann, "Electrical System Design for the SMPTE D-1 DTTR," SMPTE Journal, pp. 1215-1221, Dec. 1986.

Primary Examiner—Victor R. Kostak
Attorney, Agent, or Firm—Stevens, Davis, Miller & Mosher

[57] ABSTRACT

A digital component video signal processor or a digital VTR which can record/reproduce both an extended 4:2:2 signal based on sampling at 18 MHz and a 4:2:2 signal based on sampling at 13.5 MHz while minimizing dummy data to be generated upon recoding/reproduction. The extended 4:2:2 signal and the 4:2:2 signal are changed over by switches, and the output sides of memories use timing signals based on a clock signal of 36 MHz whereas timing signals based on the clock signal of 36 MHz and timing signals based on a clock signal of 27 MHz are changed over by a switch on the input side of the memories, whereby each of an extended 4:2:2 signal and a 4:2:2 signal at a rate of 288 Mbits/sec can be outputted to a terminal.

2 Claims, 4 Drawing Sheets

WORD RATE CONVERSION PROCESSING DEVICE FOR PROCESSOR CIRCUIT FOR PROCESSING DIGITAL COMPONENT VIDEO SIGNALS SAMPLED BY DIFFERENT SAMPLING FREQUENCIES

BACKGROUND OF THE INVENTION

The present invention relates to a digital component video signal processor in a system for recording, reproducing or transmitting a digitized component video signal, for example, a system such as a digital VTR.

A digital VTR for component video signal or a so-called D-1 VTR was put into practice commercially several years ago. The D-1 VTR is a digital VTR in which a 4:2:2 signal shown by the CCIR recommendation 601 is recorded or reproduced in a form quantized into 8 bits. The 4:2:2 signal is a signal obtained by sampling a luminance signal and two color-difference signals at 13.5 MHz and 6.75 MHz, respectively, and this 4:2:2 signal is conformable to the existing television signal which has an aspect ratio of 4:3 and is based on a scanning system of 525 lines per 60 Hz and 625 lines per 50 Hz. On the other hand, there is a trend toward an aspect ratio of 16:9 or a further lateral extension with the scanning system being kept as it is. Such a television system is called EDTV-II in Japan, ATV in U.S.A., and clean PAL, PAL plus or extended 4:2:2 in Europe. In the present specification, it will be called the extended 4:2:2 system.

If the sampling frequency of the extended 4:2:2 system is selected to be $(16/9)/(4/3)=4/3$ times as high as that of the normal 4:2:2 system, it is convenient since a horizontal resolution the same as that in the normal 4:2:2 system is obtained even if the further lateral extension is made. In this case, the sampling frequencies of a luminance signal and two color-difference signals are 18 MHz and 9 MHz, respectively. Provided that a signal obtained by quantizing those signals into 8 bits is a first digital component video signal, the data rate of that signal in a word rate frequency and bit rate representation is as follows:

word rate frequency: $18+9\times 2=36$ MHz bit rate: $(18+9\times 2)\times 8=288$ Mbits/sec.

On the other hand, the data rate of the D-1 VTR is as follows:

word rate frequency: $13.5+6.75\times 2=27$ MHz bit rate: $(13.5+6.75\times 2)\times 8=216$ Mbits/sec.

The details of the conventional digital VTR have been disclosed by, for example, SMPTE D-1 DTTR (SMPTE Journal, December, 1986). The prior art method of encoding a 10-bit sample or word into a 8-bit word, which is used in embodiments of the present invention, has been disclosed by U.S. Pat. No. 4,730,223.

Now consider D-X as a digital VTR for recording/reproducing the above first digital component video signal. The bit rate of the D-X VTR is increased to $288/216=113\%$ as compared with that of the D-1 VTR. Therefore, it is not possible to use the conventional D-1 VTR as the D-X VTR, and hence it is necessary to develop a novel digital VTR as the D-X VTR. However, since the 4:2:2 signal corresponding to the existing television signal having an aspect ratio of 4:3 will be used even in the future, the D-1 VTR will also be necessary even if a new digital VTR is fabricated as D-X. In that case, there will be two kinds of digital VTR's and casettes for D-1 and D-X, which is troublesome.

SUMMARY OF THE INVENTION

An object of the present invention is to provide a digital component video signal processor for a digital VTR with high generality in which D-1 is united into D-X to record/reproduce both an extended 4:2:2 signal and a 4:2:2 signal and wherein dummy data to be generated upon recording/reproduction is minimized.

To attain the above object, a digital component video signal processor according to the present invention comprises signal input means for inputting first and second digital component video signals in a change-over manner, the first digital component video signal being composed of three kinds of signals which include a luminance signal with a sampling frequency of 18 MHz and two color-difference signals with a sampling frequency of 9 MHz and in which the number of quantized bits in each of the three kinds of signals is 8, the second digital component video signal being composed of three kinds of signals which include a luminance signal with a sampling frequency of 13.5 MHz and two color-difference signals with a sampling frequency of 6.75 MHz and in which the number of quantized bits in each of the three kinds of signals is 10, a word encoder for encoding a 10-bit word of the second digital component video signal into an 8-bit word, and a memory for data rate conversion to high frequency for converting the data rate of the second digital component video signal to a high frequency range to obtain a data rate which is the same as the data rate of the first digital component video signal.

The data rate of the first digital component video signal is 36 MHz in terms of a word rate frequency and 288 Mbits/sec in terms of a bit rate, and the data rate of the second digital component video signal is 27 MHz in terms of a word rate frequency and 216 Mbits/sec in terms of a bit rate. With the above construction, since the word encoder processes one word of the second digital component video signal as 8 bits, the word rate frequency of the second digital component video signal after processing becomes $27\times 10/8=33.75$ Mhz which is smaller than the word rate frequency of the first digital component video signal but is a value near thereto. Also, the data rate of the second digital component video signal is made the same as that of the first digital component video signal by the memory for data rate conversion to high frequency. Therefore, it is possible to record/reproduce the first digital component video signal and the second digital component video signal by use of the same digital VTR with dummy data being minimized.

DESCRIPTION OF THE PREFERRED EMBODIMENTS

Embodiments of the present invention will now be explained in reference to the accompanying drawings.

Figure 1:
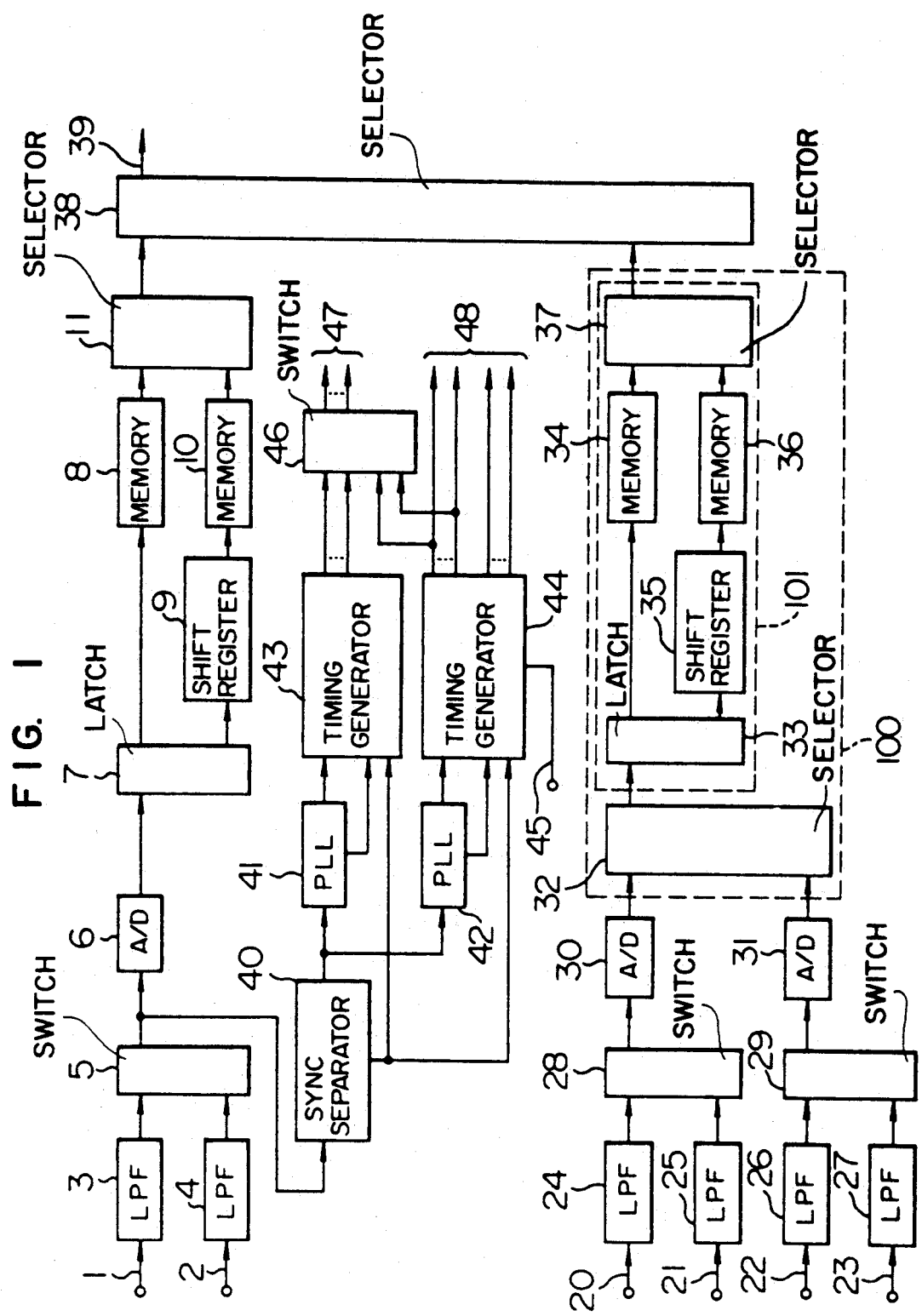
FIG. 1 is a block diagram of the entire recording section of a digital component video signal processor according to a first embodiment of the present invention.

FIG. 1 is a block diagram of the entire recording section of a digital component video signal processor according to a first embodiment of the present invention.

In FIG. 1, a luminance signal and two color-difference signals of a first analog component video signal, which is the original signal of a first digital component video signal, are inputted through terminals 1, 20 and 22 to LPF's 3, 24 and 26, respectively. A luminance signal and two color-difference signals of a second analog component video signal, which is the original signal of a second digital component video signal, are inputted through terminals 2, 21 and 23 to LPF's 4, 25 and 27, respectively. The LPF's 3, 24 and 26 correspond to sampling at 18 MHz, 9 MHz and 9 MHz, respectively and have high-band cut-off frequencies set to about 7.6 MHz, 3.6 MHz and 3.6 MHz, respectively. The LPF's 4, 25 and 27 correspond to sampling at 13.5 MHz, 6.75 MHz and 6.75 MHz, respectively and have high-band cut-off frequencies set to about 5.7 MHz, 2.7 MHz and 2.7 MHz, respectively. The luminance signal and the two color-difference signals for one of the first and second analog component video signals, which are the outputs of the LPF'S, are respectively selected by switches 5, 28 and 29 and are thereafter converted by A/D converters 6, 30 and 31 into digital component video signals. In the case of the first analog component video signal, the sampling frequencies of the luminance signal and the two color-difference signals and 18 MHz, 9 MHz and 9 MHz, respectively and the number of quantized bits in each signal is 8. In the case of the second analog component video signal, the sampling frequencies of the luminance signal and the two color-difference signals are 13.5 MHz, 6.75 MHz and 6.75 MHz, respectively and the number of quantized bits in each signal is 10.

Three means composed of means including the LPF's 3 and 4, the switch 5 and the A/D converter 6, means including the LPF's 24 and 25, the switch 28 and the A/D converter 30 and means including the LPF's 26 and 27, the switch 29 and the A/D converter 31 are collectively termed signal input means.

The two color-difference signals, which are the outputs of the A/D converters 30 and 31, are inputted to a selector 32 which in turn selects alternately those signals, in units of a sample, to output a time-shared color-difference signal. The sample rate of this time-shared color-difference signal becomes the same as that of the luminance signal on the output of the A/D converter 6. The sample rate is 18 MHz in the case of the first digital component video signal and 13.5 MHz in the case of the second digital component video signal. The luminance signal on the output of the A/D converter 6 and the time-shared color-difference signal on the output of the selector 32 are inputted to 10-bit latches 7 and 33, respectively.

Eight upper bits of the output of the latch 7 or 33 are inputted to a selector 11 or 37 through a memory 8 or 34. Two lower bits of the output of the latch 7 or 33 are inputted to a shift register 9 or 35 which successively collects four continuous samples to produce words each having eight bits. The output of the shift register 9 or 35 is inputted to the selector 11 or 37 through a memory 10 or 36 having eight bits per one word. In the case of the time-shared color-difference signal, one word produced by the shift register 35 from the lower two-bit portions is composed of the lower two-bit portions of four samples which include two continuous samples for each of the two color-difference signals. The outputs of the memories 8 and 34 including words composed of the upper eight-bit portions and the outputs of the memories 10 and 36 including words composed of the lower two-bit portions are selected by the selectors 11 and 37 in proper units as will be mentioned later on. A selector 38 selects the luminance signal from the selector 11 and the time-shared color-difference signal from the selector 37 alternately in units of one word to output the selected signal to a terminal 39.

Two means composed of means including the latch 7 and the shift register 9 and means including the latch 33 and the shift register 35 are collectively termed a word encoder. Also, two means composed of means including the memories 8 and 10 and means including the memories 34 and 36 are collectively termed a memory for data rate conversion to high frequency.

The output of the switch 5 is also inputted to a sync separator 40 to detect a horizontal sync signal and a frame sync signal. The detected horizontal sync signal is inputted to PLL's 41 and 42 which in turn generate clocks synchronous with horizontal sync signals of 27 MHz and 36 MHz, respectively. Those clocks, addresses in one horizontal scanning period produced by dividing counters in the PLL's 41 and 42 and the frame sync signal from the sync separator 40 are inputted to timing generators 43 and 44 to generate various timing signals for a digital system. A plurality of timing signals inclusive of clocks from the timing generator 43 are inputted to a switch 46. A plurality of timing signals inclusive of clocks from the timing generator 44 are outputted to a plurality of terminals 48 and a part thereof including clocks are inputted to the switch 46. The switch 46 selects input signals from the timing generator 44 in the case of the first digital component video signal and input signals from the timing generator 43 in the case of the second digital component video signal to output the selected input signals to a plurality of terminals 47. A plurality of timing signals inclusive of clocks from the terminals 47 are used for control at the timing of writing into the memories 8, 10, 34 and 36 or the memory for data rate conversion to high frequency, and a plurality of timing signals inclusive of clocks from the terminals 48 are used for control at and after the timing of reading from the memory for data rate conversion to high frequency. Namely, the output side of the memory for data rate conversion to high frequency uses always the timing signals from the timing generator 44 based on a word clock signal of 18 MHz produced from the clock signal of 36 MHz from the PLL 42, and the input side of the memory for data rate conversion to high frequency uses selectively the timing signals from the timing generator 44, in the case of the first digital component video signal, which are based on the word clock signal of 18 MHz produced from the clock signal of 36 MHz from the PLL 42 and the timing signals from the timing generator 43, in the case of the second digital component video signal, which are based on a word clock signal of 13.5 MHz produced from the clock signal of 27 MHz from the PLL 41. A first/second digital component video signal change-over signal is inputted from a terminal 45 to the timing generator 44 to change over a part of the timing signals to be outputted to the terminals 48, as will be mentioned later on.

A horizontal scanning frequency is 15.75/1.001 kHz in the case of the system of 525 lines per 60 Hz and 15.625 kHz in the case of the system of 625 lines per 50 Hz, and the total number of samples in one horizontal scanning period is determined by dividing the sampling frequency by the horizontal scanning frequency. The total numbers of samples in one horizontal scanning period for the luminance signal and the color-difference signal in the case of the first digital component video signal are 1144 samples and 572 samples in the system of 525 lines per 60 Hz and are 1152 samples and 576 samples in the case of 625 lines per 50 Hz. Those numbers in the system of the second digital component video signal are 858 samples and 429 samples in the system of 525 lines per 60 Hz and 864 samples and 432 samples in the system of 625 lines per 50 Hz.

Effective samples of the total samples in one horizontal scanning period, that is, continuous samples in a period of time excepting the horizontal sync signal are actually recorded/reproduced. The number of effective samples in the case of the second digital component video signal is defined by the CCIR recommendation 601 to be 720 samples for the luminance signal and 360 samples for the color-difference signal in each of the system of 525 lines per 60 Hz and the system of 625 lines per 50 Hz. The number of effective samples of the first digital component video signal should be increased to 4/3 (or the ratio in sampling frequency) times as large as that of the second digital component video signal or is 960 samples for the luminance signal and 480 samples for the color-difference signal.

Figure 3A:
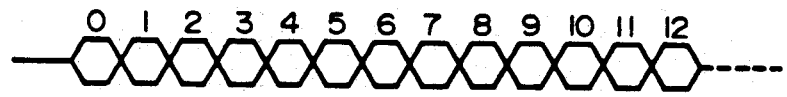
FIGS. 3A to 3E show a timing chart of the recording section of the digital component video signal processor in the first embodiment of the present invention in the case where a second digital component video signal is concerned.
Figure 3B:
Figure 3C:
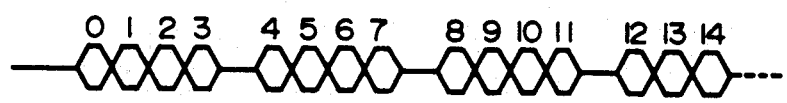
Figure 3D:
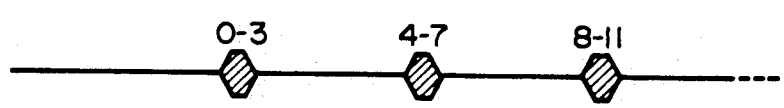
Figure 3E:
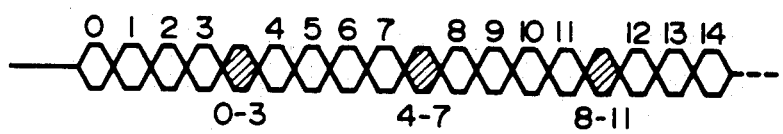

FIGS. 3A to 3E show a timing chart in the case of the second digital component video signal. FIG. 3A shows the timing of 10-bit samples from the latch 7 or 33 at a word rate frequency of 13.5 MHz. The samples are provided with addresses in the order of 0, 1, 2,—starting from the first effective sample in one horizontal scanning period. In the case of the time-shared color-difference signal from the latch 33, the two color-difference signals include one composed of samples provided with even addresses of 0, 2, 4,—and the other composed of samples provided with odd addresses of 1, 5,—. Two lower bits of each 10-bit sample shown in FIG. 3A are outputted from the shift register 9 or 35 in a form as shown by shaded samples in FIG. 3B, that is, in such a manner that the lower two-bit portions of four continuous 10-bit samples are successively collected to produce words each having 8 bits. Namely, the samples shown in FIG. 3B including one for the addresses 0 to 3, one for the addresses 4 to 7, and so on are outputted at a rate which is ¼ of the sample rate of the samples shown in FIG. 3A. Eight upper bits of each 10-bit sample shown in FIG. 3A are inputted to the memory 8 or 34 and are outputted therefrom at a word rate frequency of 18 MHz, as shown in FIG. 3C. The signal shown in FIG. 3C is delayed from the signal shown in FIG. 3A by one horizontal scanning period and is an intermittent signal in which one-word spaces are made between addresses 3 and 4, between addresses 7 and 8, and so on. The signal shown in FIG. 3B is inputted to the memory 10 or 36 and is outputted therefrom at a word rate frequency of 18 MHz, as shown in FIG. 3D. The signal shown in FIG. 3D is delayed from the signal shown in FIG. 3B by one horizontal scanning period and is timed with the one-word spaces shown in FIG. 3C. The selector 11 or 37 selects the words shown in FIG. 3C and the words shown in FIG. 3D and outputs the selected words at a word rate frequency of 18 MHz, as shown in FIG. 3E.

On the other hand, in the case of the first digital component video signal, the number of quantized bits is 8 and these bits occupy eight upper bits of each 10-bit sample from the latch 7 or 33. In this case, the selector 11 or 37 always selects only the output of the memory 8 or 34 which includes words composed of the upper eight-bit portions. Also, in this case, the delay of one horizontal scanning period is provided by the memory 8 or 34 but the intermittent read from the memory as shown in FIG. 3C is not made or effective samples are continuously read from the memory at a word rate frequency of 18 MHz for each horizontal scanning period. The change-over of the timing of reading from the memory 8 or 34 is made by inputting the change-over signal to the terminal to change over the mode of generation of timing signals from the timing generator 44.

The number of effective words of a digital signal outputted to the terminal 39, which are to be recorded in one horizontal scanning period, is 920×2=1920 words in the case of the first digital component video signal and (720+720/4)×2=1800 words in the case of the second digital component video signal.

Thus, in either case of the first digital component video signal or the second digital component video signal, the output outputted to the terminal 39 is a digital signal which includes 8 bits per one word and has a word rate frequency of 36 MHz and a bit rate of 288 Mbits/sec and in which the luminance signal and the time-shared color-difference signal are alternated at every word. In this case, dummy data in the second digital component video signal is 1920−1800=120 words per one horizontal scanning period and is only 120/1920×100=6% of the whole data. This digital signal is subjected to a signal processing for recording in the digital VTR and is then recorded on a recording medium.

Figure 2:
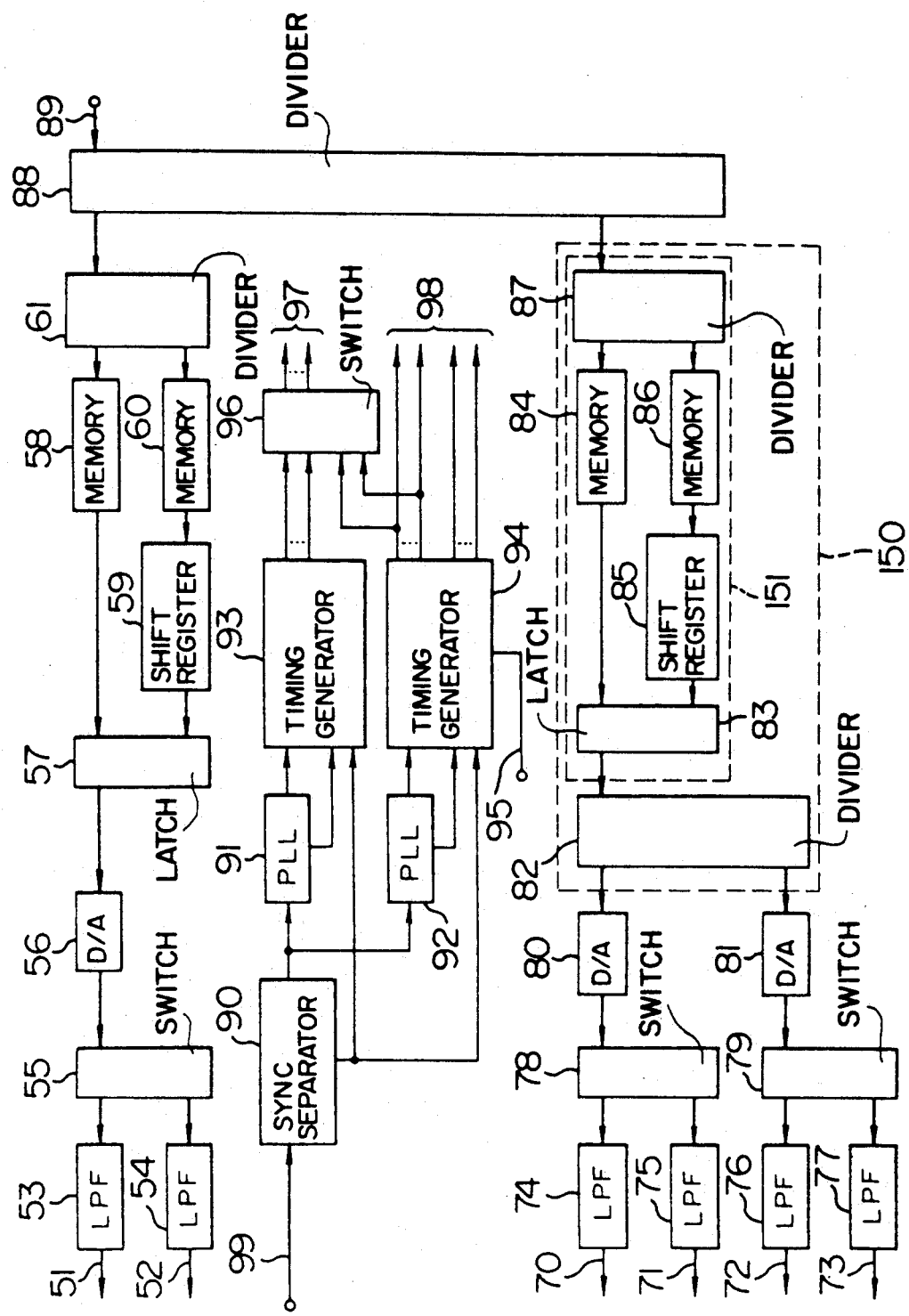
FIG. 2 is a block diagram of the entire reproducing section of the digital component video signal processor according to the first embodiment of the present invention.

FIG. 2 is a block diagram of the entire reproducing section of the digital component video signal processor according to the first embodiment of the present invention. The digital signal recorded on the medium is reproduced, is subjected to a signal processing for reproduction in the digital VTR and is then inputted to a terminal 89 shown in FIG. 2. The digital signal inputted to the terminal 89 is quite the same as the digital signal outputted to the terminal 39 shown in FIG. 1.

A divider 88 receives the digital signal from the terminal 89 to divide it alternately into a luminance signal and a time-shared color-difference signal in units of one word. The luminance signal and the time-shared color-difference signal are inputted to dividers 61 and 87, respectively. Each of the dividers 61 and 87 divides the inputted signal into words which are composed of upper eight-bit portions and words which are composed of lower two-bit portions. The words composed of upper eight-bit portions are inputted through a memory 58 or 84 to eight upper bits of a latch 57 or 83. The words composed of lower two-bit portions are inputted to a shift register 59 or 85 through a memory 60 or 86 having eight bits per one word. Each word is divided two bits by two bits into four parts in the shift register 59 or 85, and these divisional parts are continuously inputted to two lower bits of the latch 57 or 83.

Two means composed of means including the memories 58 and 60 and means including the memories 84 and 86 are collectively termed a memory for data rate conversion to low frequency. Also, two means composed of means including the latch 57 and the shift register 59 and means including the latch 83 and the shift register 85 are collectively termed a word decoder.

A reference signal such as a black burst signal is inputted to a terminal 99 so that a horizontal sync signal and a frame sync signal are detected by a sync separator 90. The detected horizontal sync signal is inputted to PLL's 91 and 92 which in turn generate clocks synchronous with horizontal sync signals of 27 MHz and 36 MHz, respectively. Those clocks, addresses in one horizontal scanning period produced by dividing counters in the PLL's 91 and 92 and the frame sync signal from the sync separator 90 are inputted to timing generators 93 and 94 to generate various timing signals for a digital system. A plurality of timing signals inclusive of clocks from the timing generator 93 are inputted to a switch 96. A plurality of timing signals inclusive of clocks from the timing generator 94 are outputted to a plurality of terminals 98 and a part thereof including clocks are inputted to the switch 96. The switch 96 selects input signals from the timing generator 94 in the case of the first digital component video signal and input signals from the timing generator 93 in the case of the second digital component video signal to output the selected input signals to a plurality of terminals 97. A plurality of timing signals inclusive of clocks from the terminals 97 are used for control at and after the timing of reading from the memories 58, 60, 84 and 86 or the memory for data rate conversion to low frequency, and a plurality of timing signals inclusive of clocks from the terminals 98 are used for a control until the timing of writing into the memory for data rate conversion to low frequency. Namely, the input side of the memory for data rate conversion to low frequency uses always the timing signals based on a word clock signal of 18 MHz produced from the clock signal of 36 MHz from the PLL 92, and the output side of the memory for data rate conversion to low frequency uses selectively the timing signals, in the case of the first digital component video signal, which are based on the word clock signal of 18 MHz produced from the clock signal of 36 MHz from the PLL 92 and the timing signals, in the case of the second digital component video signal, which are based on a word clock signal of 13.5 MHz produced from the clock signal of 27 MHz from the PLL 91. A first-/second digital component video signal change-over signal is inputted from a terminal 95 to the timing generator 94 to change over a part of the timing signals to be outputted to the terminals 98, as will be mentioned later on.

Figure 4A:
FIGS. 4A to 4E show a timing chart of the reproducing section of the digital component video signal processor in the first embodiment of the present invention in the case where the second digital component video signal is concerned.
Figure 4B:
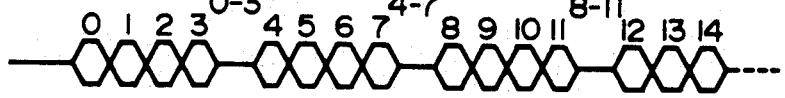
Figure 4C:
Figure 4D:
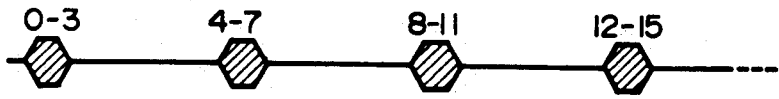
Figure 4E:

FIGS. 4A to 4E show a timing chart in the second digital component video signal. FIG. 4A shows the timing of the signal with a word rate frequency of 18 MHz inputted to the divider 61 or 87. A shaped portion represents a word composed of lower bit portions, as in FIGS. 3A to 3E. The divider 61 or 87 divides the signal shown in FIG. 4A into words which are composed of upper bit portions (see FIG. 4B) and words which are composed of lower bit portions (see FIG. 4C). The signal shown in FIG. 4B is delayed in the memory 58 or 84 by one horizontal scanning period and is then inputted to the eight upper bits of the latch 57 or 83 at a timing shown in FIG. 4C. The signal shown in FIG. 4C is delayed in the memory 60 or 86 by one horizontal scanning period and is then inputted to the shift register 59 or 85 at a timing shown in FIG. 4D. The signal inputted to the shift register 59 or 85 is supplied therefrom to the two lower bits of the latch 57 or 83 at a timing shown in FIG. 4E with one word being divided into four continuous samples each of which includes two bits.

On the other hand, in the case of the first digital component video signal, the divider 61 or 87 always selects only the input to the memory 58 or 84 which includes words composed of upper eight-bit portions. Only the delay of one horizontal scanning period is provided by the memory 58 or 84. The change-over of the timing of writing into the memory 58 or 84 is made by inputting the change-over signal to the terminal 95 to change over the mode of generation of timing signals from the timing generator 94.

The luminance signal and the time-shared color-difference signal, which are the outputs of the 10-bit latches 57 and 83, are inputted to a D/A converter 56 and a divider 82, respectively. The divider 82 divides the time-shared color-difference signal into two color-difference signals alternately in units of a sample, and the two color-difference signals are inputted to D/A converters 80 and 81, respectively.

The luminance signal and the two color-difference signals are converted by the D/A conveters 56, 80 and 81 into analog signals which are in turn passed through either LPF's 53, 78 and 79 or LPF's 54, 75 and 77 selected by selectors 55, 78 and 79 corresponding to the first component digital video signal or the second digital component video signal and are then outputted to terminals 51, 70 and 72 or terminals 52, 71 and 73.

Three means composed of means including the LPF's 53 and 54, the switch 55 and the D/A converter 56, means including the LPF's 74 and 75, the switch 78 and the D/A converter 80 and means including the LPF's 76 and 77, the switch 79 and the D/A converter 81 are collectively termed signal output means.

Change-over signals for the switches 55, 78, 79 and 96 shown in FIG. 2 and the first/second digital component video signal change-over signal inputted to the terminal 95 are manually or automatically produced. In the case of a manual operation, the change-over is made through a manual operation from a front panel of an equipment in which the reproducing part shown in FIG. 2 is incorporated. In the case of an automatic operation, the change-over signal is superimposed on the digital signal outputted to the terminal 9 shown in FIG. 1 and this change-over signal is detected from the digital signal inputted to the terminal 89 shown in FIG. 2. A location, where the change-over signal is to be superimposed may be a horizontal blanking period, a vertical blanking period, or a sync block ID on a tape format of the digital VTR.

As has been explained above, according to the present embodiment, a first analog component video signal and a second analog component video signal are changed over by the switches 5, 28 and 29 shown in FIG. 1, and the output side of the memory for data rate conversion to high frequency including the memories 8, 10, 34 and 36 shown in FIG. 1 uses timing signals based on a word clock signal of 18 MHz, whereas the changeover of timing signals based on the word clock signal of 18 MHz and timing signals based on a word clock signal of 13.5 MHz is made by the switch 46 in the input side of the memory for data rate conversion to high frequency. Therefore, it is possible to output to the terminal 39 each of a first digital component video signal and a second digital component video signal at a rate of 288 Mbits/sec. With the construction of FIG. 2 similar to that of FIG. 1, the first digital component video signal and the second digital component video signal of the rate of 288 Mbits/sec outputted to the terminal 39 can be restored to the first analog component video signal and the second analog component video signal, respectively.

Figure 5:
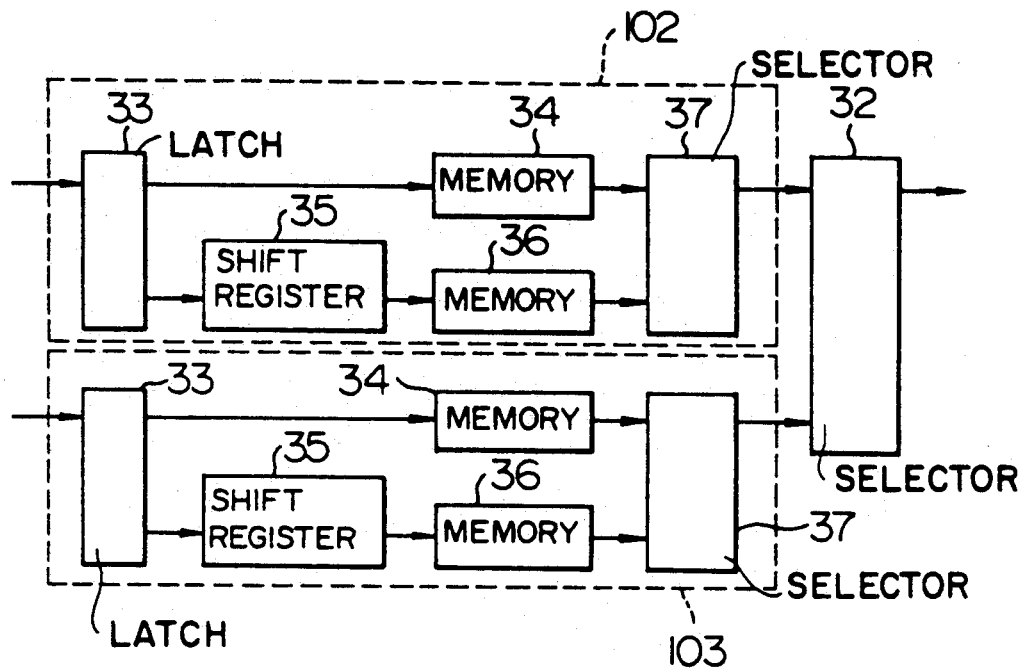
FIG. 5 is a block diagram of a part of a recording section of a digital component video signal processor according to a second embodiment of the present invention.

FIG. 5 is a block diagram of a part of a recording section of a digital component video signal processor according to a second embodiment of the present invention. A block diagram of the entire recording section in the second embodiment corresponds to one in which a partial block diagram 100 enclosed by broken line in the whole block diagram of the recording section in the first embodiment shown in FIG. 1 is replaced by the partial block diagram of the recording section in the second embodiment shown in FIG. 5. Each of partial block diagrams 102 and 103 enclosed by broken lines in FIG. 5 is the same as a partial block diagram 101 enclosed by broken line in FIG. 1. In FIG. 1, two color-difference signals from the A/D converters 30 and 31 are developed by the selector 32 into a time-shared color-difference signal which is in turn supplied to the partial block diagram 101. In FIG. 5, on the other hand, the two color-difference signals are respectively supplied to the partial block diagrams 102 and 103 in parallel and are thereafter developed by a selector 32 into a time-shared color-difference signal. Namely, in the first embodiment shown in FIG. 1, one word produced by the shift register 35 including lower two-bit portions is formed by the lower two-bit portions of four samples in total which include two continuous samples of each of two color-difference signals. In the second embodiment shown in FIG. 5, one word produced by a shift register 35 is formed by the lower two-bit portions of four continuous samples of one of two color-difference signals. However, in the second embodiment, it is necessary that the rate of those ones of timing signals generated by the timing generators 43 and 44 shown in FIG. 1, which are used for the color-difference signals, is reduced to one half at parts where two color-difference signals are processed in parallel, as shown in FIG. 5.

Figure 6:
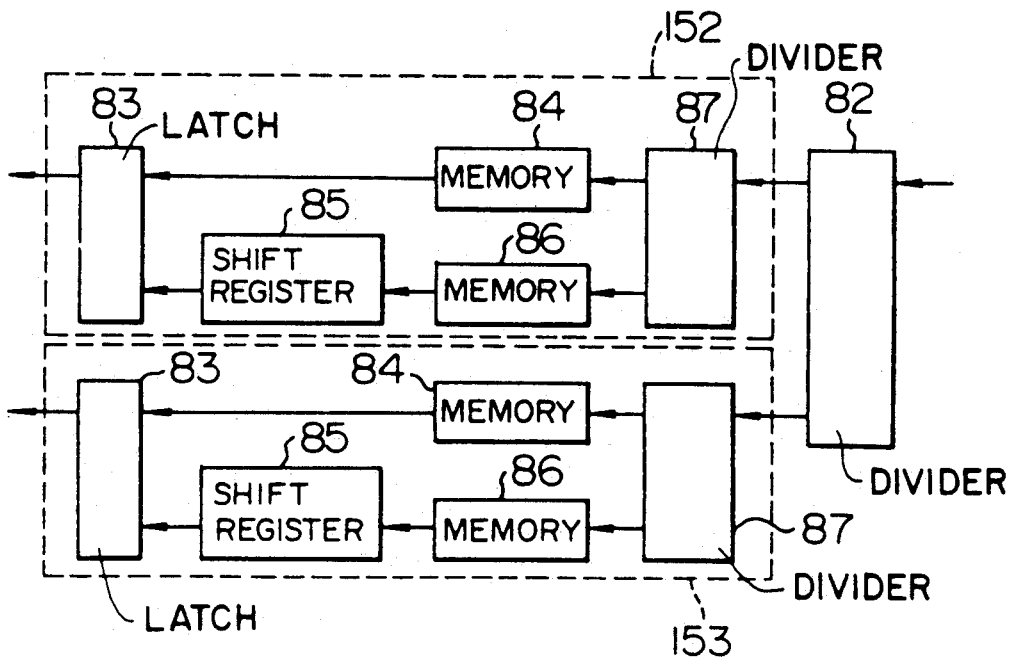
FIG. 6 is a block diagram of a part of a reproducing section of a digital component video signal processor according to the second embodiment of the present invention.

FIG. 6 is a block diagram of a part of a reproducing section of the digital component video signal processor according to the second embodiment of the present invention. A block diagram of the entire reproducing section in the second embodiment corresponds to one in which a partial block diagram 150 enclosed by broken line in the whole block diagram of the reproducing section in the first embodiment shown in FIG. 2 is replaced by the partial block diagram of the reproducing section in the second embodiment shown in FIG. 6. Each of partial block diagrams 152 and 153 enclosed by broken lines in FIG. 6 is the same as a partial block diagram 151 enclosed by broken line in FIG. 2. In FIG. 2, a time-shared color-difference signal is passed through the partial block diagram 151 and is thereafter divided by the divider 82 into two color-difference signals. In FIG. 6, on the other hand, a time-shared color-difference signal is divided by a divider 82 into two color-difference signals which are in turn passed through the partial block diagrams 152 and 153 in parallel. In the second embodiment, it is necessary that the rate of those ones of timing signals generated by the timing generators 93 and 93 shown in FIG. 2, which are used for the color-difference signals, is reduced to one half at parts where two color-difference signals are processed in parallel, as shown in FIG. 6.

As has been explained above, according to the present embodiment, the partial block diagrams 102 and 103 shown in FIG. 5 or the partial block diagrams 152 and 153 shown in FIG. 6 are provided for two color-difference signals, respectively. By this arrangement, one word including lower two-bit portions can be formed by lower two-bit portions of four continuous samples of one of the two color-difference signals. In this case, even if a word including lower two-bit portions becomes erroneous in a recording/reproducing process, only one color-difference signal is deteriorated but there occurs no simultaneous deterioration of two color-difference signals.

In FIGS. 1 and 2, two kinds of PLL's are used for producing clock signals of 27 MHz and 36 MHz. Alternatively, one PLL for 108 MHz may be used in such a manner that clock signals of 27 MHz and 36 MHz are produced by frequency division. In FIG. 1, the luminance signal and the time-shared color-difference signal are multiplexed by the selector 38. However, if those signals are recorded/reproduced in parallel without being multiplexed, one PLL for 54 MHz suffices since clocks required are 27 MHz and 18 MHz.

In the foregoing embodiments, the word rate frequency on the output side of the memory for data rate conversion to high frequency and on the input side of the memory data rate conversion to low frequency is 18 MHz. However, any frequency may be used so long as it is higher than 13.5 MHz and no excess and deficiency of words occurs in the memory for data rate conversion to high frequency and the memory for data rate conversion to low frequency. Also, though a delay of about one horizontal scanning period is provided by the memory for data rate conversion to high frequency and the memory for data rate conversion to low frequency, the delay may be several-tens of horizontal scanning intervals or one field interval.

In the foregoing embodiments, the word encoder is followed by the memory for data rate conversion to high frequency and the memory for data rate conversion to low frequency is followed by the word decoder. However, even if the order is reversed, a similar effect can be attained. Namely, the memory for data rate conversion to high frequency may be followed by the word encoder and the word decoder may be followed by the memory for data rate conversion to low frequency.

One word including lower two-bit portions is formed by one of two signals including the luminance signal and the time-shared color-difference signal in the case of the first embodiment and by one of three signals including the luminance signal and the two color-difference signals in the case of the second embodiment. However, the word may be formed by a mixture of the luminance signal and the two color-difference signals irrespective of the kind of signal, for example, four samples in total which include two samples from the luminance signal, one sample from one of the two color-difference signals and one sample from the other color-difference signal.

In the foregoing embodiments, the switches 5, 28 and 29 shown in FIG. 1 and the switches 55, 78 and 79 shown in FIG. 2 are disposed at an analog circuit portion on the input side of the A/D converters and at an analog circuit portion on the output side of the D/A converters, respectively. However, the switches may be disposed at digital circuit portions. In this case, it is required to employ a number of A/D converters and D/A converters two times as large as the number of A/D converters and the D/A converters shown in FIGS. 1 and 2.

In the foregoing embodiments, the number of quantized bits in the second digital component video signal is 10. However, it may be 8 as in the conventional D-1 VTR.

In the foregoing embodiments, a process from the output from the terminal 39 shown in FIG. 1 to the input to the terminal 89 shown in FIG. 2 is assumed to be a process of recording into and reproduction from a digital VTR. However, it may be a process of transmission by a coaxial cable, an optical cable or the like.

As is apparent from the foregoing, in the present invention, there are provided signal input means for inputting a first digital component video signal of 8 bits and a second digital component video signal of 10 bits in a change-over manner, a word encoder and a memory for data rate conversion to high frequency. With this arrangement, both the first digital component video signal and the second digital component video signal, that is, an extended 4:2:2 signal of 8 bits and a 4:2:2 signal of 10 bits can be recorded/reproduced with no large change in construction of a digital VTR and while minimizing dummy data to be produced in the case of the 4:2:2 signal of 10 bits. Therefore, it is not necessary to fabricate digital VTR's for the exclusive use of the extended 4:2:2 signal of 8 bits and the 4:2:2 signal of 10 bits. Accordingly, the complexity of handing two kinds of cassettes for the exclusive use of those signals is also eliminated. Further, there can be attained a high image quality of the 4:2:2 signal of 10 bits which could not be attained by the conventional D-1 VTR.

We claim:

1. A digital component video signal processor comprising signal input means for inputting first and second digital component video signals in a change-over manner, said first digital component video signal being composed of three kinds of signals which include a luminance signal with a sampling frequency of 18 MHz and two color-difference signals with sampling frequency of 9 MHz and in which the number of quantized bits in each of the three kinds of signals is 8, said second digital component video signal being composed of three kinds of signals which include a luminance signal with a sampling frequency of 13.5 MHz and two color-difference signals with a sampling frequency of 6.75 MHz and in which the number of quantized bits in each of the three kinds of signals is 10, a word encoder for encoding a 10-bit word of said second digital component video signal into an 8-bit word, and a memory for data rate conversion to high frequency for converting the data rate of said second digital component video signal to a high frequency range to obtain a data rate which is the same as the data rate of said first digital component video signal.

2. A digital component video signal processor according to claim 1, comprising a device for performing a processing for decoding of a digital signal subjected to a processing of encoding by the digital component video signal processor according to claim 1, said device including a memory for data rate conversion to low frequency for converting the same data rate of said second digital component video signal as that of said first digital component video signal to a low frequency range, a word decoder for decoding an 8-bit word of said second digital component video signal into a 10-bit word, and signal output means for outputting said second digital component video signal and said first digital component video signal.

* * * * *